United States Patent [19]

Hammond et al.

[11] 3,927,240

[45] Dec. 16, 1975

[54] HAZE RESISTANT CATHODE LUMINESCENT SULFIDE PHOSPHORS AND METHOD OF PREPARING SAME

[75] Inventors: Michael J. Hammond, Ulster; Raymond F. Herner, Towanda, both of Pa.

[73] Assignee: GTE Sylvania Incorporated, Stamford, Conn.

[22] Filed: June 12, 1974

[21] Appl. No.: 478,696

[52] U.S. Cl. .... 428/403; 252/301.6 S; 252/301.4 S; 252/301.4 P; 252/301.6 P; 427/215; 427/377; 428/539
[51] Int. Cl.² .................. C09K 11/42; C09K 11/02
[58] Field of Search. 252/301.4 S, 301.4 P, 301.6 S, 252/301.6 P; 117/33.5 C, 33.5 L, 100 B; 428/403, 539; 427/215, 377

[56] References Cited
UNITED STATES PATENTS

| | | | |
|---|---|---|---|
| 2,758,941 | 8/1956 | Crosby et al. | 252/301.6 S X |
| 2,965,512 | 12/1960 | Umberger et al. | 252/301.6 S X |
| 3,310,418 | 3/1967 | Friedman | 117/33.5 L |
| 3,522,071 | 7/1970 | Yokota et al. | 252/301.6 S X |
| 3,607,371 | 9/1971 | Haynes et al. | 117/100 B |

*Primary Examiner*—Jack Cooper
*Attorney, Agent, or Firm*—Norman J. O'Malley; Donald R. Castle; John C. Fox

[57] ABSTRACT

A cathodoluminescent phosphor composition consisting essentially from about 99.6 percent to about 99.9 percent by weight of discrete particles of an activated host containing a divalent metal cation and a sulfide anion and from about 0.1 percent to about 0.4 percent by weight of a phosphate selected from the group consisting of calcium pyrophosphate and strontium pyrophosphate as a coating over the surfaces of the particles renders the cathodoluminescent phosphor haze resistant when used in cathode ray tubes. A process for preparing the cathodoluminescent phosphor comprises dispersing the sulfide phosphor in water to obtain a predetermined concentration of the phosphor, thereafter in either order a controlled amount of a water soluble pyrophosphate source sufficient to provide the desired concentration of pyrophosphate ions and a sufficient amount of a water soluble strontium or calcium salt to react with the pyrophosphate ions is added. The resulting precipitated material is separated from the water and washed to a desired purity and dried. In the case of a strontium pyrophosphate coated material, a further annealing step has additional advantageous results.

11 Claims, No Drawings

HAZE RESISTANT CATHODE LUMINESCENT SULFIDE PHOSPHORS AND METHOD OF PREPARING SAME

BACKGROUND OF THE INVENTION

1. Field of the Invention

This invention relates to an improved sulfide phosphor which is haze resistance. More particularly, it relates to rendering a sulfide phosphor containing a divalent metal cation haze resistant by applying a coating of either calcium pyrophosphate or strontium pyrophosphate over the surfaces of the particles of the phosphor.

2. Prior Art

The conventional method of making a color TV tube involves applying a photosensitive slurry of each phosphor used to emit green, blue and red colors and exposing through the appropriate shadow mask. The slurries are normally individually applied by spin coating onto a TV faceplate, drying, exposing the photosensitive slurry to a predetermined light pattern and removing the unexposed slurry. A problem encountered in this process is that phosphor particles can tend to remain on the glass, cause a type of cross-contamination as subsequent colors are laid down on top of them. This leads to a loss in color purity and, if severe enough, gives a washed-out appearance on the finished tube. This condition is known as hazing, or fogging, and is not usually removed by normal developing methods.

One approach to eliminate hazing is to coat the phosphor with a material that will not stick on the glass faceplate. Two such coatings, $Mg_2P_2O_7$ and $AlPO_4$, are known and both have several shortcomings. After coating phosphors with the above materials, washing procedures are made difficult due to the stable suspension formed. $Mg_2P_2O_7$ coated phosphors exhibit high conductivities and frequently require increased exposure times. Also in the case of $AlPO_4$, high coating weights (0.3 – 0.5 wt. percent $PO_4^{-3}$) are necessary on certain phosphors to substantially reduce haze.

It is believed that a phosphor which is coated with a material that will prevent stickage on the glass faceplate and does not require increased exposure time or exhibit high conductivities would be an advancement in the art.

OBJECTS AND SUMMARY OF THE INVENTION

It is an object of this invention to provide an improved divalent metal sulfide phosphor composition.

It is an additional object of this invention to provide a cathodoluminescent phosphor composition which is haze resistant.

It is still a further object of this invention to provide a simple process for applying a coating to a sulfide phosphor composition which will prevent haze.

These and other objects of this invention are achieved in one aspect wherein a cathodoluminescent phosphor composition is provided which consists essentially of from about 99.6 percent to about 99.9 percent by weight of an activated host containing a divalent metal cation and a sulfide anion and from about 0.1 percent to about 0.4 percent by weight of a phosphate coating selected from the group consisting of calcium pyrophosphate and strontium pyrophosphate.

In an additional aspect of this invention the foregoing pyrophosphate coatings are provided by dispersing a predetermined amount of an activated sulfide phosphor composition in water having a controlled temperature and thereafter adding in either order sufficient amounts of a water soluble pyrophosphate source and an appropriate amount of a water soluble strontium or calcium salt to provide strontium or calcium pyrophosphate which coats the individual discrete particles of the sulfide phosphor. Thereafter, the material is separated from the water and washed with sufficient water to remove the byproducts of the reaction and dried. In the case of a sulfide phosphor coated with strontium pyrophosphate, it is advantageous to provide an additional step of heating the dried material to a temperature of from about 400° to 450°C for about 1 to 3 hours.

DETAILS OF THE PREFERRED EMBODIMENTS

For a better understanding of the present invention, together with other and further objects, advantages and capabilities thereof, reference is made to the following disclosure and appended claims in connection with the above description of some of the aspects of the invention.

The sulfide host materials treated in accordance with this invention generally have an average particle size of from about 1 to about 20 microns (FSSS) and include zinc sulfide, cadmium sulfide and zinc cadmium sulfide.

To coat the foregoing sulfide phosphors with calcium pyrophosphate, the following procedure is used. The phosphor is dispersed in hot (at about 70°C) deionized water. After 3–5 minutes agitation, the desired amount of pyrophosphate is added as a soluble salt, e.g., $Na_4P_2O_7 \cdot 10H_2O$. After 2–5 minutes, the stoichiometric amount of calcium (with a slight excess, if desired) is added as a soluble salt, e.g., $Ca(NO_3)_2$ or $CaCl_2$. After a few minutes of agitation, the powder is allowed to settle, washed three times, filtered and dried.

To coat the sulfide phosphor with strontium pyrophosphate, essentially the same procedure is used except that the phosphor after being dried is heated at about 400°C to about 450°C for about 1 to 3 hours.

The preferred coating weight is from about 0.10 to about 0.15 percent by weight of $P_2O_7$ based upon the total composition. At 0.037 percent by weight of $P_2O_7$ (by analysis), the haze level is measured at 10–20 particles/0.07 mm². Higher coating weights than 0.15 percent can be used, but are not necessary and above about 0.4 percent can be detrimental.

Application of the coating to the phosphor has been found to be fairly quantitative from about 0.05 percent by weight of $P_2O_7$ to 0.4 percent by weight of $P_2O_7$. Data is shown in Table I. As shown in Table I, for zinc sulfide at coating weights above 0.10 percent, the deposition is generally about 85 percent.

TABLE I

| Wt. % $P_2O_7$ Added | $P_2O_7$ by Analysis | $\dfrac{P_2O_7 \text{ (Analysis)}}{P_2O_7 \text{ (Added)}} \times 100$ |
| --- | --- | --- |
| 0.05 | 0.037 | 74% |
| 0.10 | 0.10 | 100% |
| 0.15 | 0.13 | 87% |
| 0.20 | 0.16 | 80% |
| 0.30 | 0.26 | 87% |
| 0.40 | 0.34 | 85% |

Coating experiments with calcium and strontium pyrophosphate have shown it to be reproducible in wet and dry state handling characteristics and reliability as an anti-haze agent at coating weights from about 0.10 percent by weight of $P_2O_7$ and higher.

To more fully illustrate the above invention, the following detailed Examples are presented. All parts and proportions are by weight unless otherwise indicated.

EXAMPLE I

To test the coating, a single lot of phosphor is selected and divided into three parts. One part is uncoated, the second is silica coated, and the third is coated with calcium pyrophosphate.

The three phosphor samples are formulated into dichromate polyvinyl alcohol slurries and single-dot panels are made from each of them. During the various processing steps, conditions are held as constant as possible. After developing the exposed panels, each is evaluated for its haze level. To do this, random areas on the faceplate are selected and the number of particles in an area of 0.06 mm² (approximately the area of a dot 0.0115 inch diameter) between exposed dots are counted.

For the uncoated phosphor, the number of particles constituting haze is 40–50 particles/0.06 mm². For the silica-coated sample, the number is 50+ particles/0.06 mm². For the calcium pyrophosphate-coated sample, the count is 0–10 particles/0.06 mm². Thus, it is evident that calcium pyrophosphate is effective as an anti-haze agent.

Similar tests are conducted using the pyrophosphates of barium. Phosphors coated with this material at the 0.4 wt. percent $P_2O_7^{-4}$ level did not exhibit low hazing characteristics and are in the order of 40 to 50 particles/0.06 mm².

EXAMPLE II

About 300 parts of a silver-activated zinc sulfide blue emitting cathodoluminescent phosphor is dispersed in about 1,000 parts of hot (160°F) deionized water. While agitating, about 30 parts of a 0.058 molar $Na_4P_2O_7 \cdot 10H_2O$ aqueous solution are added. This solution contains 10 mg $P_2O_7^{-4}$/ml. After about 3–5 minutes, about 33 parts of a 0.12 molar $Ca(NO_3)_2$ aqueous solution are added. The quantity of solution is about 10 mol percent in excess of the theoretical amount of calcium needed for quantitative precipitation of the pyrophosphate. After about 10 minutes, the agitation is stopped and the phosphor is allowed to settle. After decanting, the powder is washed three times with three washes of hot deionized water of 1,000 parts each, filtered and dried at 110°–140°C. The dried powder is screened through a 325 mesh sieve and is free-flowing in the dry state.

The above procedure was followed except about 15 parts of a $P_2O_7^{-4}$ solution (0.058 molar $Na_4P_2O_7 \cdot 10H_2O$) are added and 17 parts of a $Ca^{+2}$ solution [0.12 molar $Ca(NO_3)_2$] are added to obtain a 0.05 percent by weight of a calcium pyrophosphate coating.

The above procedure was used except that about 60 parts of a $P_2O_7^{-4}$ solution (0.058 molar $Na_4P_2O_7 \cdot 10H_2O$) are added and about 65 parts of a $Ca^{+2}$ solution [0.12 molar $Ca(NO_3)_2$] are added for a 0.2 percent coating. In each instance the haze resistant is equal to that of the calcium pyrophosphate coating material of Example I.

Additionally, an appropriate $CaCl_2$ solution can be used in place of the calcium nitrate solution of the foregoing with good results.

EXAMPLE III

Essentially the same procedure is followed as in Example II except that in place of calcium nitrate or calcium chloride solution being added, barium nitrate is added and the same molar equivalent amounts in place of the calcium sources disclosed in Example II.

About 300 parts ZnS:Ag are dispersed in 1,000 parts of hot (160°F) deionized water. To this is added 120 parts $Na_4P_2O_7$ solution and agitated for 3–5 minutes. Then about 130 parts of a 0.12M $Ba(NO_3)_2$ solution is added to precipitate barium pyrophosphate. After 5 minutes agitation, the phosphor is allowed to settle. Then, the powder is washed three times, filtered and dried. The coated had poor dry state flow characteristics and hazed badly in a normal slurry operation.

When using strontium as in Example I, it has been found to be beneficial to anneal the powder for about 1 to 3 hours in an inert atmosphere at a temperature of from about 400°C to about 450°C. Substantially similar results to those obtained with the $Ca_2P_2O_7$ coated material in Example I. The strontium pyrophosphate coated material exhibits stability over a wider pH range than does $Ca_2P_2O_7$ and is preferred for some sulfide phosphors.

For example 300 grams of ZnS:Ag is first washed with hot sodium thiosulfate to remove the surface silver. After washing the powder to remove the residual thiosulfate, the powder is slurried in about 1,000 ml of hot (160°F) deionized water. Then about 30 parts of a 0.058 molar $Na_4P_2O_7 \cdot 10H_2O$ solution are added. After 3–5 minutes about 35 parts of a 0.12 molar $Sr(NO_3)_2$ solution are added. After 10 minutes agitation, the powder is allowed to settle, washed three times, filtered and dried. After drying, the sample is placed in a closed crucible and annealed at 400°–450°C for 1–3 hours. After cooling, it is given one or two water washes, filtered and dried. AFter drying, it is dry sieved through a 200 mesh screen. The powders perform very well in a normal slurry.

For example, such modifications can include, but are not limited to the use of different amounts of phosphor dispersed in the water such as from about 10 to 40 percent by weight of the dispersion, the temperature of the water can be varied from about 150°F to 200°F. The coated material after being separated from the water can be washed with water to remove residual undesired salts that resulted from the reaction and other obvious modifications.

While there has been shown and described what are at present considered the preferred embodiments of the invention, it will be obvious to those skilled in the art that various changes and modifications may be made therein without departing from the scope of the invention as defined by the appended claims.

What is claimed is:

1. A cathodoluminescent phosphor composition consisting essentially of from about 99.6 percent to about 99.9 percent by weight of discrete particles of an activated host of a divalent metal sulfide and, as a coating over the surfaces of said particles, from about 0.1 percent to about 0.4 percent by weight on a $P_2O_7$ basis of a pyrophosphate selected from the group consisting of calcium pyrophosphate and strontium pyrophosphate.

2. A phosphor composition according to claim 1 wherein said particles have an average particle size of from about 1 to about 20 micrometers.

3. A phosphor composition according to claim 1 wherein said host is selected from the group consisting of zinc sulfide, cadmium sulfide and zinc-cadmium sulfide.

4. A phosphor composition according to claim 3 wherein said pyrophosphate is calcium pyrophosphate.

5. A phosphor composition according to claim 3 wherein said pyrophosphate is strontium pyrophosphate.

6. A phosphor composition according to claim 3 wherein the pyrophosphate content is from about 0.10 percent to about 0.15 percent by weight of $P_2O_7$ based on the total composition.

7. A process suitable for providing a phosphate coating on the surfaces of a cathodoluminescent phosphor activated host comprising:
   a. dispersing a predetermined amount of a phosphor having an activated host of a divalent metal sulfide in water;
   b. adding to the aqueous dispersion an amount of a water-soluble pyrophosphate source to yield at least about 0.1 percent to about 0.4 percent by weight of pyrophosphate ions based on the weight of the phosphor and at least a stoichiometric amount of a reactive water-soluble strontium or calcium salt;
   c. separating the resulting calcium or strontium pyrophosphate-coated phosphor from the aqueous phase; and
   d. drying said coated phosphor to remove any residual water.

8. A process according to claim 7 wherein said salt is a water-soluble strontium salt.

9. A process according to claim 8 wherein after said drying step said phosphor is heated in an inert atmosphere at about 400°C to about 450°C for from about 1 to about 3 hours.

10. A process according to claim 8 wherein said water-soluble salt is strontium nitrate and said pyrophosphate source is sodium pyrophosphate.

11. A process according to claim 7 wherein said salt is a calcium salt selected from the group consisting of calcium chloride and calcium nitrate and said pyrophosphate source is sodium pyrophosphate.

* * * * *